United States Patent
Hohmann

[11] Patent Number: 5,970,652
[45] Date of Patent: Oct. 26, 1999

[54] PORTABLE AND ADJUSTABLE BRINE TANK FOR CONSIGNABLE TUNA FISH

[76] Inventor: Scott C. Hohmann, 60 R.F. Higgins Dr., Norwell, Mass. 02061

[21] Appl. No.: 08/909,548

[22] Filed: Aug. 12, 1997

[51] Int. Cl.⁶ .................................................. A01K 97/20
[52] U.S. Cl. ............................... 43/55; 224/406; 383/2; 383/7; 383/111
[58] Field of Search .................. 43/55; 114/255; 224/406, 563; 383/2, 7, 38, 110, 111

[56] References Cited

U.S. PATENT DOCUMENTS

| | | | |
|---|---|---|---|
| 268,558 | 12/1882 | Small | 43/55 |
| 1,579,560 | 4/1926 | Moore | 43/55 |
| 1,719,591 | 7/1929 | Collins | 43/55 |
| 2,040,559 | 5/1936 | Luttrell | 43/55 |
| 2,603,028 | 7/1952 | Roberts | 43/55 |
| 2,966,002 | 12/1960 | Hobson et al. | 43/55 |
| 2,974,437 | 3/1961 | Stadler | 43/55 |
| 3,073,367 | 1/1963 | Samara | 383/110 |
| 3,148,476 | 9/1964 | Ethridge | 43/55 |
| 3,229,946 | 1/1966 | MacKay | 224/563 |
| 3,236,206 | 2/1966 | Willinger | 43/55 |
| 3,674,188 | 7/1972 | Anderson | 43/55 |
| 3,716,938 | 2/1973 | Ammons | 43/55 |
| 4,212,377 | 7/1980 | Weinreb | 383/38 |
| 4,301,920 | 11/1981 | Boggs | 206/315.1 |
| 4,492,006 | 1/1985 | Ishii | 383/38 |
| 4,498,190 | 2/1985 | Garlick, III | 43/55 |
| 4,642,934 | 2/1987 | Carlson et al. | 43/55 |
| 4,988,216 | 1/1991 | Lyman | 383/110 |
| 5,165,198 | 11/1992 | Kilian, III | 43/55 |
| 5,302,029 | 4/1994 | Weber et al. | 383/111 |
| 5,373,802 | 12/1994 | Krolick et al. | 224/406 |
| 5,499,473 | 3/1996 | Ramberg | 43/55 |
| 5,620,124 | 4/1997 | Geier | 224/563 |
| 5,797,491 | 8/1998 | Fierek et al. | 383/38 |
| 5,857,778 | 1/1999 | Ells | 383/110 |

*Primary Examiner*—Michael J. Carone
*Assistant Examiner*—Darren Ark
*Attorney, Agent, or Firm*—John P. McGonagle

[57] ABSTRACT

An insulated, flexible, canvas container which attaches to a boat when in use. The bag has several parallel, longitudinal fasteners for closing the bag thereby providing means for adjusting the size of the bag to fish of various diameters. The bag has an internal flap which provides a means for shortening the length of the bag. The bag is made from rugged, water-impervious material.

10 Claims, 8 Drawing Sheets

PORTABLE AND ADJUSTABLE BRINE TANK FOR CONSIGNABLE TUNA FISH

BACKGROUND OF THE INVENTION

This invention relates to a collapsible container, and particularly to a container especially adapted for use aboard a boat to store a large fish, such as a tuna fish.

Fishing for large fish, such as tuna, marlin, sailfish, swordfish, and the like, may well take place twenty to one hundred miles from shore. This means that the fish must be stored in refrigeration or ice if it is to be preserved in weight, edibility and/or appearance for consignment purposes. A fishing boat is typically equipped with a container to store ice and fish. Such a container usually comprises a rigid box forming a permanent part of the boat. One problem with this construction is that the box is a permanent part of the boat thereby taking up a substantial amount of space regardless of whether the box is actually being used. The box also adds undesired weight to the boat. In order to overcome this, portable rigid chests have been utilized which may be placed in and removed from a boat depending on the need at the time. Generally, these types of chests are bulky, heavy and difficult to manipulate.

In the case of boats fishing for tuna, marlin, sailfish, swordfish, and the like, the normal size of the boat utilized does not afford enough practical space for a large permanent or rigid fish box that would be required to contain such a fish which commonly vary in length from six to twelve feet. The cost and weight of such a container would be substantial due to the size required. Since the degree of dehydration of the fish often determines the weight and appearance, and therefore the commercial value of the fish, in the case of large, non-consignable fish, the only current alternative to having a large fish box is to return to port after each day's catch to avoid spoilage. This requires considerable amounts of fuel, time and related expenses.

Several attempts have been made in the prior art to address the above problems. U.S. Pat. No. 4,301,920 to John N. Boggs, discloses a bag device for preserving and protecting game-fish. The Boggs bag includes a layered insulating sheathing which is foldable about a fold line for partially enclosing and insulating the fish in ice. Velcro fastening tape carried around the periphery of the sheath and fold line effectively seals the main body portion therein and around the extended portions of the fish. When folded, the bag has normal dimensions of eight feet by three feet. When the fish is enclosed in the Boggs bag it is then laid out on the cockpit deck. The Boggs bag does not have the capability of holding brine.

U.S. Pat. No. 3,716,938 to Walter D. Ammons, discloses a suspended fish box. The fish box is comprised of a collapsible tubular frame over which a flexible, water-tight sheet is fashioned. Hooks are fixedly attached to a boat and a top bar of the frame engages said hooks.

Neither the Boggs or Ammons bags are adjustable in size. The Boggs bag is simply laid out on a deck. There are no means for fastening the bag to the boat. The Boggs bag will easily shift and slide around during moderate to heavy seas. The Ammons bag is dependent on a tubular frame to give the bag shape and affix the bag to the boat. For large fish, i.e., two hundred pounds or more and a diameter in the range of sixteen inches, the tubular frame would require tremendous strength. The placement of a large fish into the Ammons bag would require some nonstandard rigging or several men to avoid damage to the frame while placing the fish into the bag.

SUMMARY OF THE INVENTION

In view of the disadvantages inherent in the known types of devices now present in the prior art, the present invention provides a portable and adjustable bag for the storage and preservation of large fish. The bag of the present invention does not require a frame to hold its shape. The bag has means for attachment to a boat and also has a structure which makes it easily removed and stored when not in use. As such, the general purpose of the present invention, which will be described subsequently in greater detail, is to provide a bag for preserving and insulating a large fish, said bag being portable and adjustable to fit various sized fish.

To attain this, the present invention is comprised of an insulated, flexible, bag-like, water proof container which attaches to a boat when in use and which is readily rolled up and stored when not in use. The bag has several parallel, longitudinal fasteners for closing the bag thereby providing means for adjusting the size of the bag to fish of various diameters. The bag has an internal flap which provides a means for shortening the length of the bag. The bag is made from rugged, water-impervious material.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF THE INVENTION

Figure 1A:
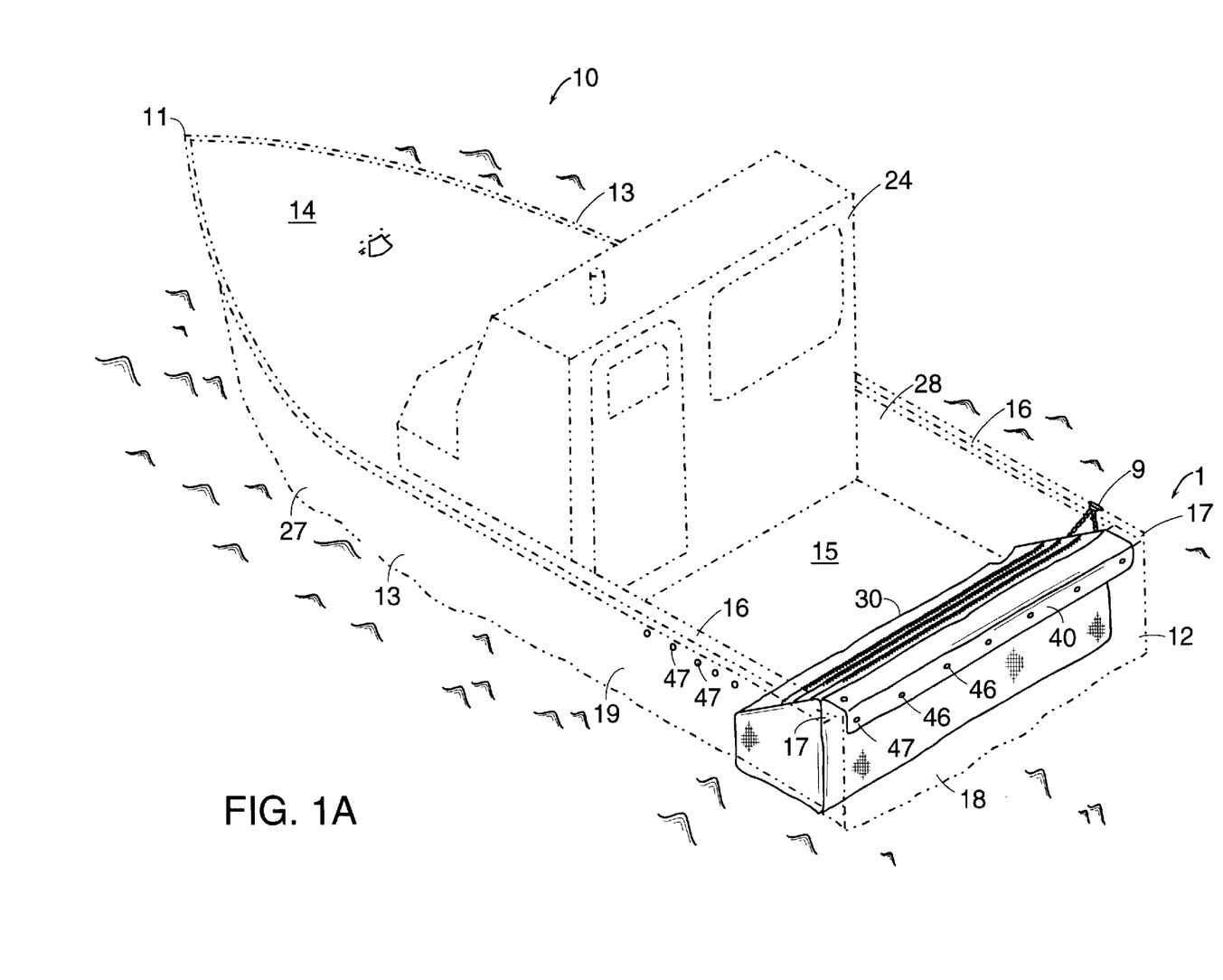
FIG. 1A is a rear perspective view of a boat with the invention attached thereto.

Referring to the drawings in detail wherein like elements are indicated by like numerals, there is shown in FIG. 1 a typical fishing boat 10 with the invention 1 attached thereto. The boat 10 has a bow 11, stern 12, two curves sides 13, an exterior 27, an interior 28 containing a front deck 14 and a rear deck 15, a cabin 24 separating the front deck 14 and the rear deck 15, gunnels 16 formed on the portion of the sides 13 defining the rear deck 15, and a transom 17 formed on the boat stern 12. Fishing boats come in many shapes, sizes and configurations. The boat 10 shown in this application is meant to show a generalized fishing boat for purposes of illustration and is not meant to limit the invention to a boat of this particular configuration.

The invention 1 is adapted to being attached across either the boat transom 17 or one of the gunnels 16. The invention 1 is comprised canvas bag-like container 30 forming a tank for holding a large fish 4. The container is made from rugged, water-impervious material, such as canvas. Insulation 25 is also provided within the container interior 38. The container 30 is further adapted to holding brine 2 and ice 3 around the fish 4 within the container 30. The container 30 has a front 31, rear 32, left side 33, right side 34, bottom 35, top 36, exterior 37 and interior 38. The sides 33, 34 define the longitudinal axis of the container 30. In this embodiment of the invention 1 the container 30 has a side 33 to side 34 length of ninety-nine inches which is just short of the nominal gunnel 16 to gunnel 16 width of most fishing boats 10 near to the stern 12, i.e., approximately one hundred two inches. The sides 33, 34 rise from the bottom 35 to the bag top 36 and interconnect the front 31 with the rear 32. The sides 33, 34, bottom 35, top 36, front 31 and rear 32 define the container interior 38.

Figure 1B:
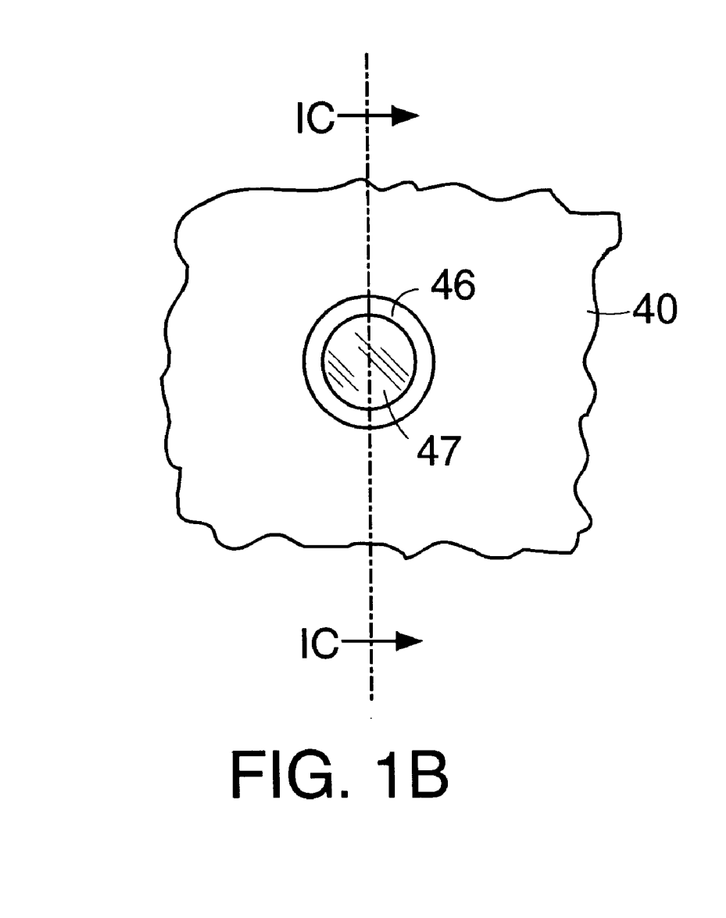
FIG. 1B is a close up view, partly in section, of a container first flap fastener joined to a boat fastener.
Figure 1C:
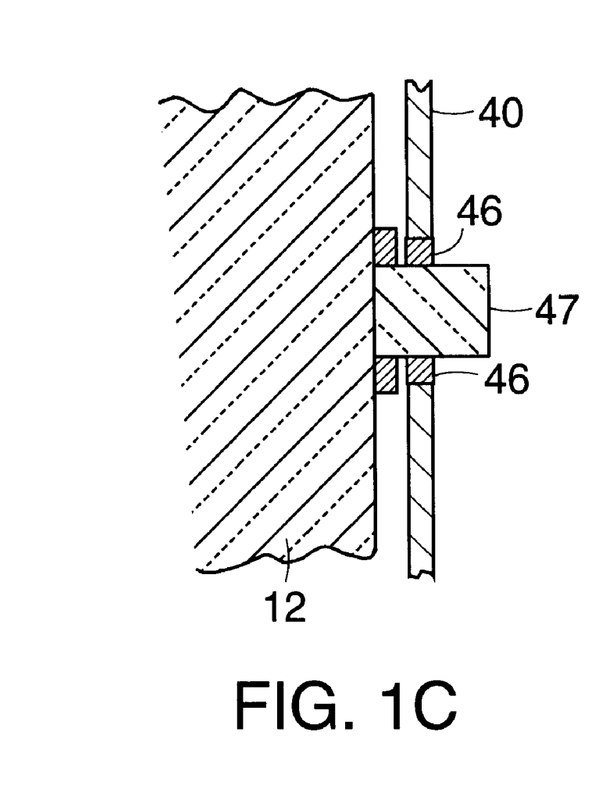
FIG. 1C is a cross sectional view along the line 1C—1C of FIG. 1B.
Figure 2:
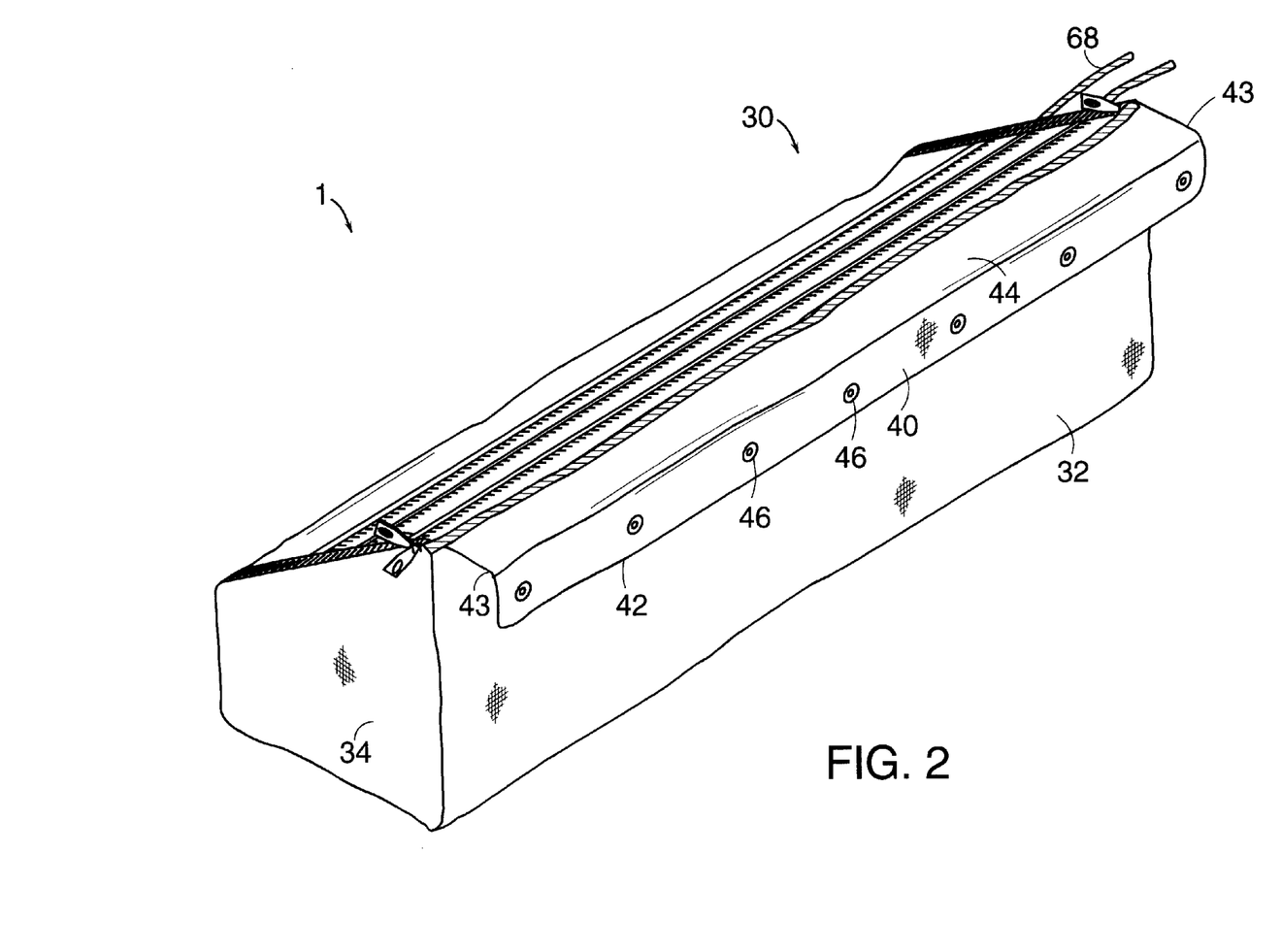
FIG. 2 is a rear perspective view of the invention.
Figure 3:
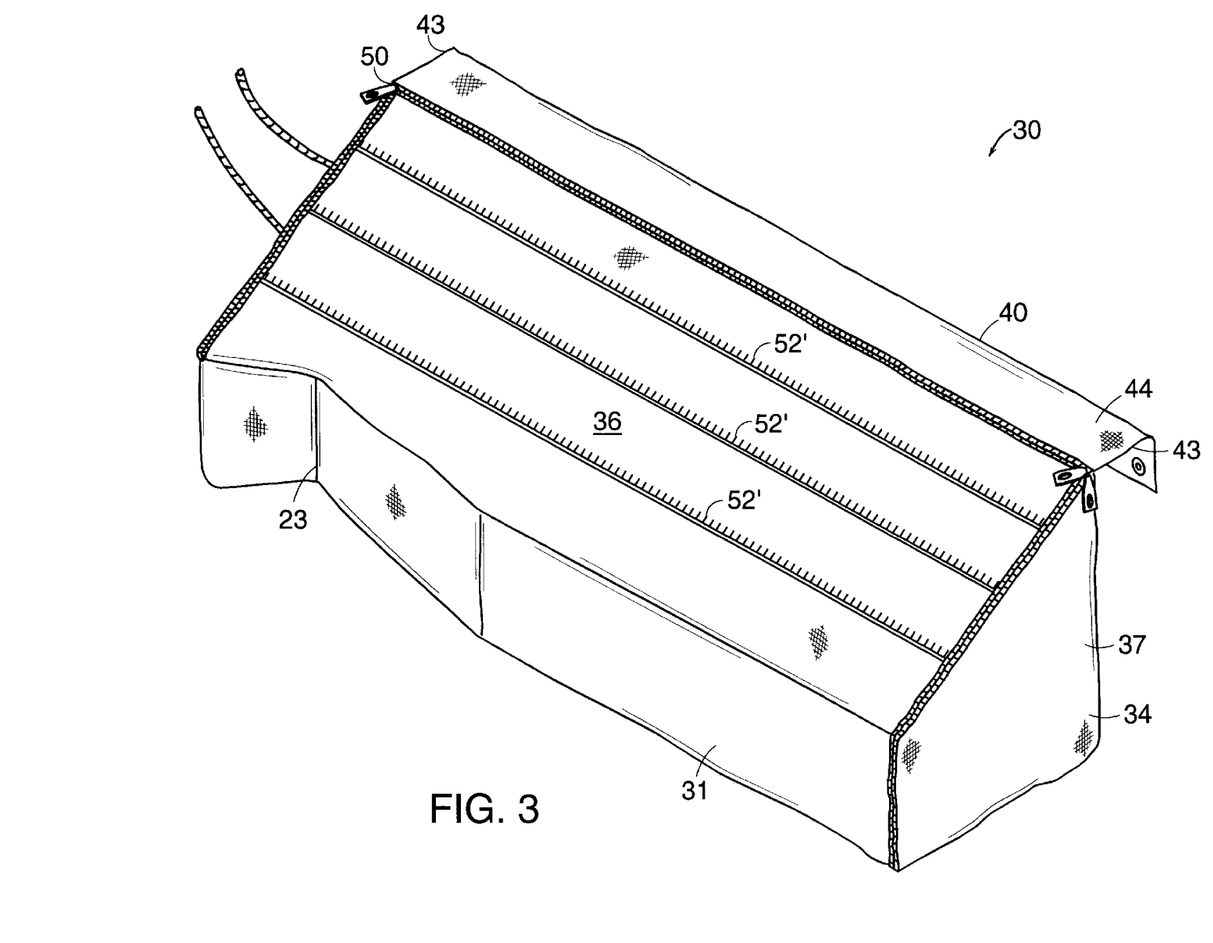
FIG. 3 is a front perspective view of the invention.
Figure 4:
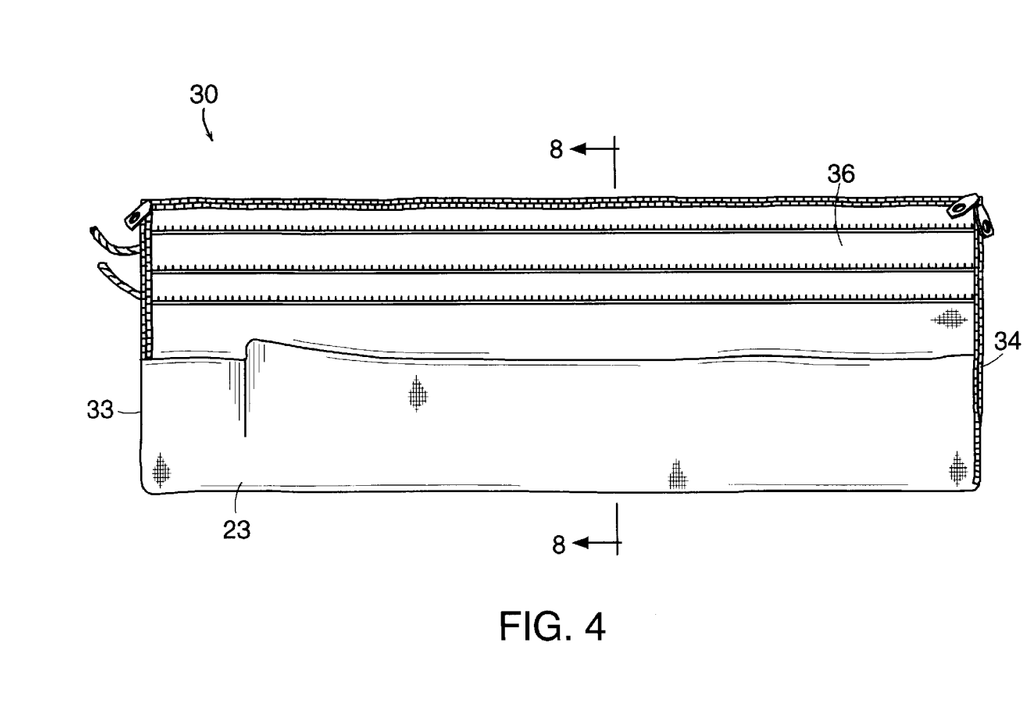
FIG. 4 is a front elevational view of the invention.
Figure 5:
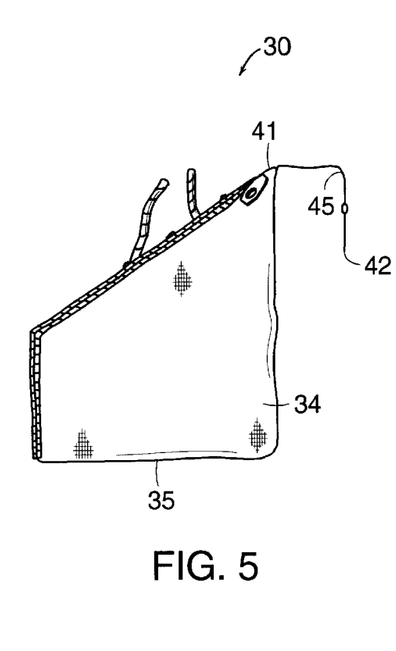
FIG. 5 is a right side elevational view of the invention.
Figure 6:
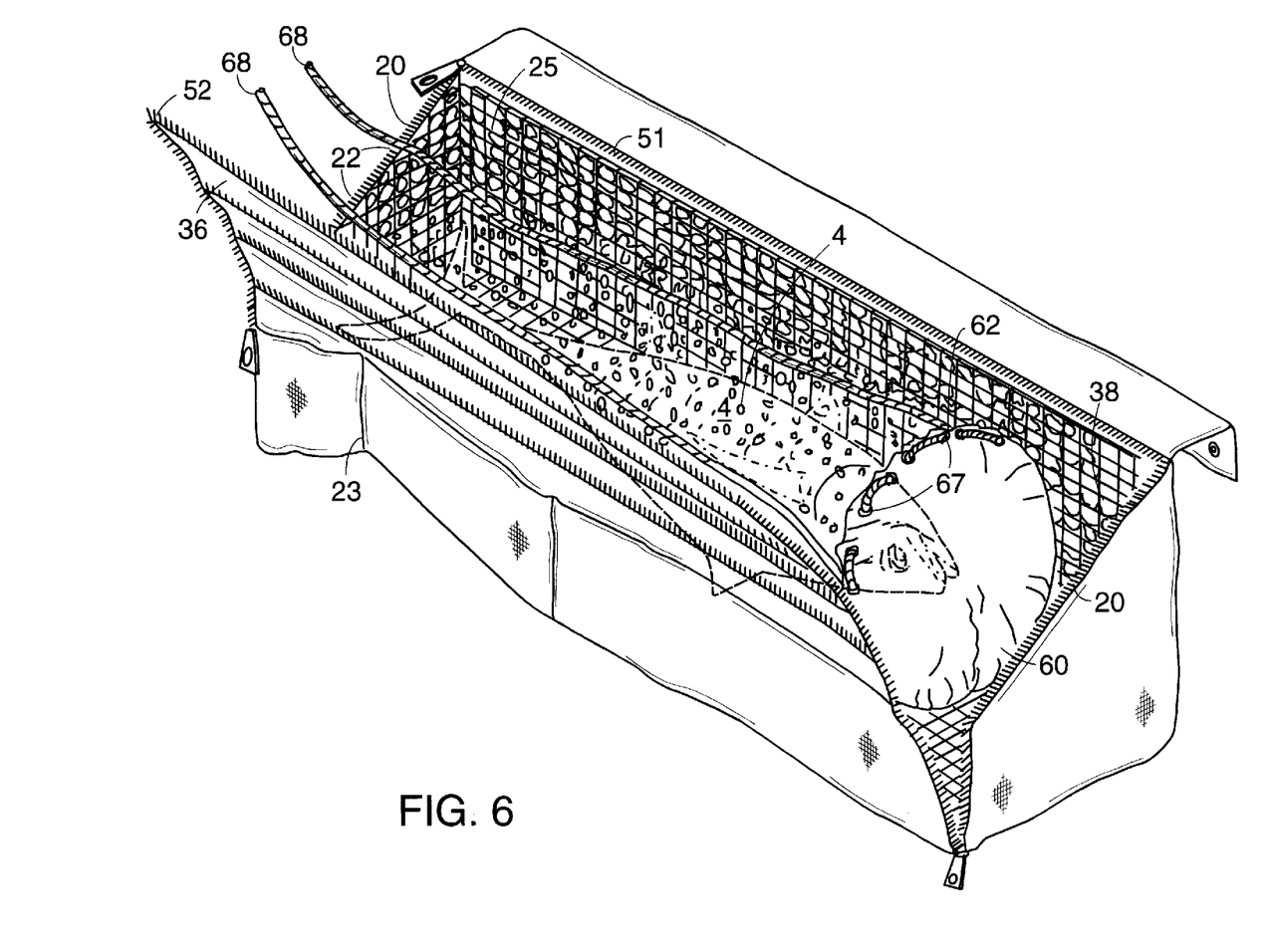
FIG. 6 is a front perspective view with the invention open.
Figure 7:
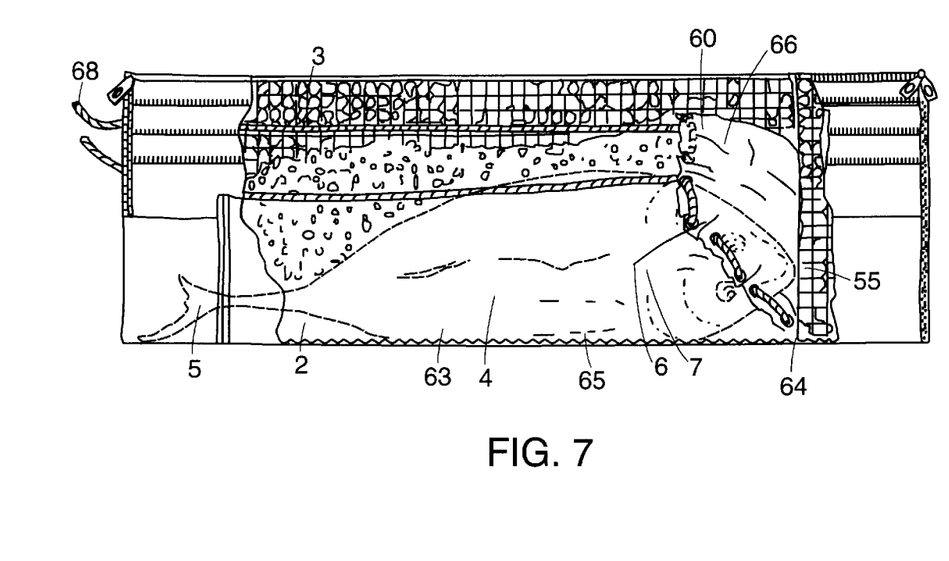
FIG. 7 is a front view of the invention, partly in section.
Figure 8:
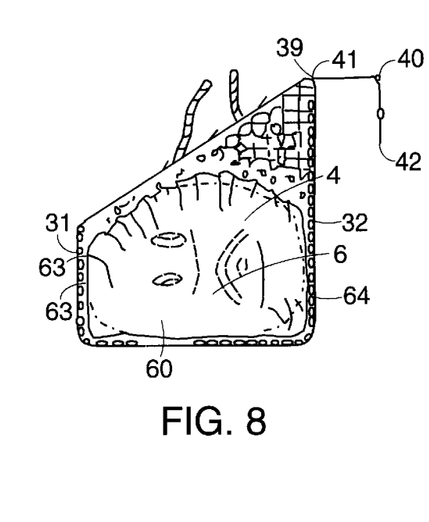
FIG. 8 is a view of the invention along the line 8—8 of FIG. 4.
Figure 9:
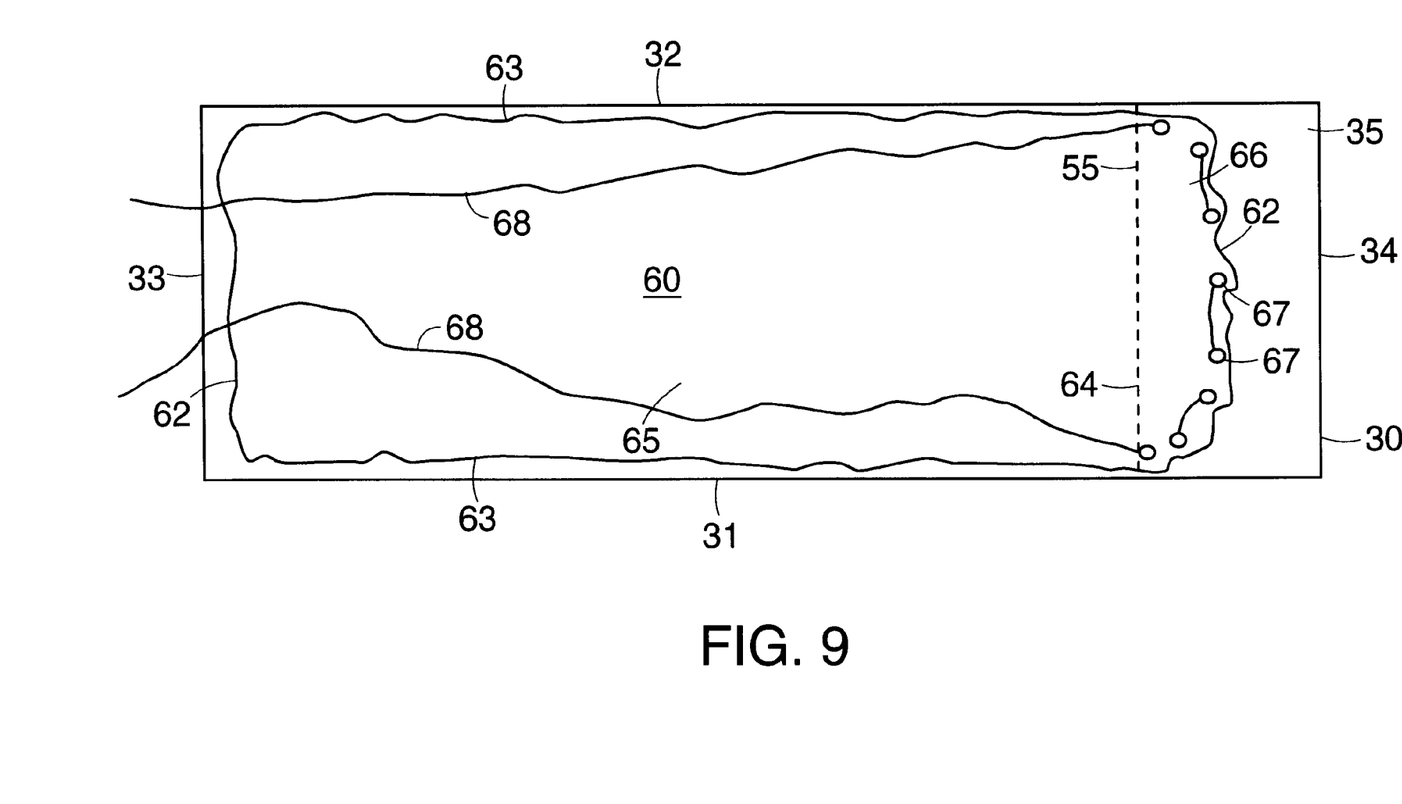
FIG. 9 is a top view, partly in section, of the Invention.

An elongated first flap 40 is fixedly attached to the container 30 along a junction 39 formed by the container rear 32 and top 36, said first flap 40 extending from one container side 33 to the other container side 34. The first flap 40 has a front edge 41 attached along its length to the junction 39, an opposite rear unattached edge 42, two opposite sides 43, an upper surface 44 and a lower surface 45. The longitudinal axis of the first flap 40 is defined by the two sides 43. A number of fasteners 46 are fixedly attached to the flap near to the rear unattached edge 42. A corresponding number of fasteners 47 are attached to the stern exterior 18 just below the transom 17. Alternatively, or in addition to the stern fasteners 47, a corresponding number of fasteners 47 may be attached to either or both boat side exteriors 19 just below the gunnels 16. The container 30 is adapted to being attached to the boat 10 by means of the first flap 40. The container bottom 35 sits on the rear deck 15 with the container rear 32 against either the stern 12 or one of the boat sides 13. The first flap 40 is positioned over either the transom 17 or one of the boat gunnels 16. The flap fasteners 46 are joined to the boat fasteners 47, thereby securing the container 30 to the boat 10.

The container 30 has an elongated fastener 50 across the junction 39 and continuing across the top 20 and front 21 of each container side 33, 34. In this embodiment of the invention, the fastener 50 is a zipper. The zipper 50 has a permanent elongated row 51 across the container rear 32 at the junction 39 and continuing across the top 20 and front 21 of each container side 33, 34. The zipper permanent elongated row 51 mates with one of a plurality of opposite zipper rows 52 attached to the container top 36. In this embodiment of the invention there are four opposite zipper rows 52. The first opposite zipper row 52 is attached to the container top 36 at the junction 39 and continuing along each the top adjacent to each side 33, 34 and continuing down the container front adjacent to each side 33, 34. The remaining opposite rows 52' are parallel and equispaced to each other and run from container side 33 to container side 34. The selection of a different opposite zipper row 52 or 52' for mating with the permanent zipper row 51 permits adjustment of a container interior front 31 to rear 32 cross section 8.

The interior 38 of the container 30 is water proof and insulated. At the seventy-three inch mark moving from the container left side 33 toward the container right side 34, a loose second flap 60 is attached to the container interior 38. The interior second flap 60 is made from a water-impervious material. The interior second flap 60 is attached to the container interior 38 along a front 31 to rear 32 cross section seam 55 perpendicular to the container longitudinal axis. The interior second flap 60 is attached along the seam 55 to the front 31, bottom 35 and rear 32. The attachment seam 55 is water tight. The interior second flap 60 has a generally rectangular shape with two opposite short sides 62 and two opposite long sides 63. The interior flap short sides 62 are initially positioned parallel to the container sides 33, 34. The interior flap long sides 63 are initially positioned parallel to the container front 31 and rear 32. The interior second flap 60 is joined to the attachment seam 55 along an interior flap line 64 parallel to the interior flap short sides 62. That portion of the interior flap between the flap short side 62 and flap attachment line 64 toward the container left side is designated the flap floor portion 65. That portion of the interior flap between the flap short side 62 and the flap attachment line 64 toward the container right side is designated the flap wall portion 66. A plurality of eyelets 67 are attached to the interior second flap 60 near to the flap wall portion short side 62. A rope 68 is threaded through the eyelets 67.

When a fish 4 is placed into the container interior 38, the fish 4 is positioned so that its tail 5 is against the container left side 33 and its head 6 is toward the container right side 34. The fish 4 will rest on the container bottom 35 and will lie, in part, on the interior flap floor portion 65. Since the fish 4 will generally have a length of between seventy-three inches and ninety-nine inches, the interior flap wall portion 66 is adapted to changing the size of the container interior 38 to accommodate the longitudinal size, i.e., head to tail, of the fish 4. The rope 68 threaded through the interior flap eyelets 67 is drawn vertically upward away from the container bottom 35 through the container top 36. The rope 68 is then drawn over the fish head 6 toward the container left side 33. This action causes the interior flap wall portion 66 to move over the fish head 6 to the fish gill plate 7. The rope 68 is then passed through one or two holes 22 in the left side wall 33 and tied to a boat cleat 9. Adjustment for the diameter of the fish 4 may be made by choosing the appropriate opposite zipper row 52 or 52' for mating with the zipper permanent row 51. Before the rope 68 is tied to the cleat 9 and the zipper 50 is closed, brine 2 and ice 3 are packed around the fish 4.

To better hold the fish 4 in place, especially during rough seas, the container front 31 may be shaped so that the tail 5 of the fish 4 can be used to help lock the fish 4 to the container left side 33. This may be done by means of a simple vertical indentation 23 in the container front 31 near to the container left side 33.

It is understood that the above-described embodiment is merely illustrative of the application. The bag can be set up to be left or right handed. Other embodiments may be readily devised by those skilled in the art which will embody the principles of the invention and fall within the spirit and scope thereof.

I claim:

1. A portable and adjustable bag for the storage, insulation and preservation of large fish, said bag being removably attached to a boat, said boat having a bow, stern, two curved sides, an exterior, an interior containing a front deck and a rear deck, gunnels formed on a portion of the sides defining the rear deck, and a transom formed on the boat stern, said bag being adapted to attach across the boat transom, comprising:

an insulated, flexible, water proof container forming a tank for holding a large fish, said container having a front, rear, left side, right side, bottom, top, and exterior, said sides, bottom, top, front and rear defining a container interior and exterior, said sides defining a container longitudinal axis, said sides rising from the bottom to the bag top and interconnect the front with the rear;

an elongated first flap fixedly attached to the container along a junction formed by the container rear and top, said first flap extending from one container side to the other container side, said first flap having a front edge attached along its length to the junction, an opposite rear unattached edge, two opposite sides, an upper surface and a lower surface, said flap having a longitudinal axis defined by the two sides, said first flap being positionable over said boat transom;

a plurality of flap fasteners fixedly attached to the first flap near said rear unattached edge;

a plurality of fasteners attachable to the boat exterior on the stern just below the transom;

wherein, said first flap fasteners are joined to the boat fasteners, thereby securing the container to the boat;

wherein said container bottom sits on the rear deck with the container rear against the stern;

a loose second flap made from a water-impervious material and having a generally rectangular shape with two opposite short sides and two opposite long sides, said short sides being initially positioned parallel to the container sides and said long sides being initially positioned parallel to the container front and rear, said second flap being attached to the container interior along a front to bottom to rear cross-section seam perpendicular to the container longitudinal axis, said attachment seam being water tight, said second flap being joined to the attachment seam along a second flap line parallel to the interior flap short sides, said second flap having a plurality of eyelets attached to the short side nearest the container right side, said second flap having a rope threaded through said eyelets;

an elongated fastener across said junction formed by the container rear and top and continuing across the top and front of each container side, said fastener being comprised of:
  a permanent elongated fastening row across the container rear at said junction and continuing across the top and front of each container side;
  a plurality of opposite and parallel fastening rows attached to the container top, each said opposite and parallel fastening row adapted to matingly join said permanent elongated fastening row.

2. The bag as recited in claim 1, wherein:
said container front has a vertical indentation near the container left side.

3. The bag as recited in claim 2, wherein:
said container is made from canvas.

4. The bag as recited in claim 3, wherein:
said elongated fastener is a zipper.

5. The bag as recited in claim 4, wherein said plurality of opposite and parallel fastening rows is comprised of four opposite zipper rows, comprising:
a first opposite zipper row attached to the container top at the junction and continuing along the top adjacent to each side and continuing down the container front adjacent to each side;
a second, third and fourth opposite zipper row attached to said container top and being parallel and equispaced to each other and running from container side to container side.

6. A portable and adjustable bag for the storage, insulation and preservation of large fish, said bag being removably attached to a boat, said boat having a bow, stern, two curved sides, an exterior, an interior containing a front deck and a rear deck, gunnels formed on a portion of the sides defining the rear deck, and a transom formed on the boat stern, said bag being adapted to attach across a gunnel, comprising:

an insulated, flexible, water proof container forming a tank for holding a large fish, said container having a front, rear, left side, right side, bottom, top, and exterior, said sides, bottom, top, front and rear defining a container interior and exterior, said sides defining a container longitudinal axis, said sides rising from the bottom to the bag top and interconnect the front with the rear;

an elongated first flap fixedly attached to the container along a junction formed by the container rear and top, said first flap extending from one container side to the other container side, said first flap having a front edge attached along its length to the junction, an opposite rear unattached edge, two opposite sides, an upper surface and a lower surface, said flap having a longitudinal axis defined by the two sides, said first flap being positionable over a gunnel;

a plurality of flap fasteners fixedly attached to the first flap near said rear unattached edge;

a plurality of fasteners attachable to the boat exterior on a side just below the gunnel;

wherein, said first flap fasteners are joined to the boat fasteners, thereby securing the container to the boat;

wherein said container bottom sits on the rear deck with the container rear against a side;

a loose second flap made from a water-impervious material and having a generally rectangular shape with two opposite short sides and two opposite long sides, said short sides being initially positioned parallel to the container sides and said long sides being initially positioned parallel to the container front and rear, said second flap being attached to the container interior along a front to bottom to rear cross-section seam perpendicular to the container longitudinal axis, said attachment seam being water tight, said second flap being joined to the attachment seam along a second flap line parallel to the interior flap short sides, said second flap having a plurality of eyelets attached to the short side nearest the container right side, said second flap having a rope threaded through said eyelets;

an elongated fastener across said junction formed by the container rear and top and continuing across the top and front of each container side, said fastener being comprised of:
  a permanent elongated fastening row across the container rear at said junction and continuing across the top and front of each container side;
  a plurality of opposite and parallel fastening rows attached to the container top, each said opposite and parallel fastening row adapted to matingly join said permanent elongated fastening row.

7. The bag as recited in claim 6, wherein:

said container front has a vertical indentation near the container left side.

8. The bag as recited in claim 7, wherein:

said container is made from canvas.

9. The bag as recited in claim 8, wherein:

said elongated fastener is a zipper.

10. The bag as recited in claim 9, wherein said plurality of opposite and parallel fastening rows is comprised of four opposite zipper rows, comprising:

a first opposite zipper row attached to the container top at the junction and continuing along the top adjacent to each side and continuing down the container front adjacent to each side;

a second, third and fourth opposite zipper row attached to said container top and being parallel and equispaced to each other and running from container side to container side.

\* \* \* \* \*